(12) United States Patent
Nagatani et al.

(10) Patent No.: US 10,866,496 B1
(45) Date of Patent: Dec. 15, 2020

(54) PROJECTOR

(71) Applicant: SEIKO EPSON CORPORATION, Tokyo (JP)

(72) Inventors: Kaname Nagatani, Matsumoto (JP); Osamu Katsuda, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/997,141

(22) Filed: Aug. 19, 2020

(30) Foreign Application Priority Data

Aug. 20, 2019 (JP) ................. 2019-150416

(51) Int. Cl.
| | |
|---|---|
| G03B 21/14 | (2006.01) |
| G03B 21/16 | (2006.01) |
| G03B 21/00 | (2006.01) |
| H01J 17/28 | (2006.01) |
| G03B 21/20 | (2006.01) |
| H04N 9/31 | (2006.01) |

(52) U.S. Cl.
CPC .......... *G03B 21/16* (2013.01); *G03B 21/005* (2013.01); *G03B 21/2013* (2013.01); *G03B 21/2033* (2013.01); *H01J 17/28* (2013.01); *H04N 9/3144* (2013.01)

(58) Field of Classification Search
CPC ...... G03B 21/14; G03B 21/16; G03B 21/005; G03B 21/2013; G03B 21/2033; H04N 5/74; H04N 9/3144; H01J 17/28

USPC .............................................. 353/52, 54, 61
See application file for complete search history.

(56) References Cited

U.S. PATENT DOCUMENTS

| 9,261,761 B2 * | 2/2016 | Kuriaki | ............... | G03B 21/005 |
| 2015/0198869 A1 * | 7/2015 | Kuriaki | ............... | G03B 21/005 |
| | | | | 353/31 |

FOREIGN PATENT DOCUMENTS

| JP | H11-282361 A | 10/1999 |
| JP | 2009-122385 A | 6/2009 |
| JP | 2015-132659 A | 7/2015 |

* cited by examiner

*Primary Examiner* — William C. Dowling
(74) *Attorney, Agent, or Firm* — Oliff PLC

(57) ABSTRACT

A projector includes an exterior housing of the projector, a first cooling target, and a cooling apparatus provided in the exterior housing and cooling the first cooling target. The cooling apparatus includes a first compressor compressing an operating fluid in a gas phase, a condenser condensing the gas-phase operating fluid compressed by the first compressor into the operating fluid in a liquid phase, a first expander decompressing the liquid-phase operating fluid condensed by the condenser to change to the operating fluid in which the liquid phase and the gas phase are mixed with each other, and a first evaporator changing part of the liquid-phase operating fluid supplied from the first expander to the gas-phase operating fluid by using heat transferred from the first cooling target and discharging the gas-phase operating fluid to the first compressor.

8 Claims, 6 Drawing Sheets

PROJECTOR

The present application is based on, and claims priority from JP Application Serial Number 2019-150416, filed Aug. 20, 2019, the disclosure of which is hereby incorporated by reference herein in its entirety.

BACKGROUND

1. Technical Field

The present disclosure relates to a projector.

2. Related Art

There has been a known projector including an indoor unit that is installed in a room and projects video images and an outdoor unit installed outside the room (see JP-A-2015-132659, for example).

In the projector described in JP-A-2015-132659, the indoor unit includes RGB laser clusters, an optical combiner, and a projection lens and further includes RGB laser heat absorbers, a first coolant tube, a drain pipe, and an electronic expansion valve. The outdoor unit includes a second coolant tube, a cooling apparatus, and a coolant heater. The following components are disposed between the indoor unit and the outdoor unit: a coolant tube that couples one end of the first coolant tube to one end of the second coolant tube; another coolant tube that couples the other end of the first coolant tube to the other end of the second coolant tube; and a communication line.

In the projector described above, the electronic expansion valve, the G laser heat absorber, the B laser heat absorber, and the R laser heat absorber are coupled in series to each other in the presented order via the first coolant tube.

The second coolant tube along with the first coolant tube via the coolant tubes forms an annular coolant path. The coolant circulates in the following order: one end of the electronic expansion valve; the laser heat absorbers; the coolant heater; a coolant compressor and a condenser of the cooling apparatus; and the other end of the electronic expansion valve.

The coolant compressor compresses a coolant gas to raise the temperature and pressure of the coolant gas. The condenser performs heat exchange in such a way that the heat of the coolant gas having the raised temperature and pressure is transferred to outside air flowing from the space outside the outdoor unit via a fan to convert the coolant gas into a high-pressure liquid coolant.

The electronic expansion valve decompresses the high-pressure liquid coolant into a liquid coolant that tends to vaporize. The electronic expansion valve controls the amount of decrease in pressure of the coolant in the first coolant tube to control the coolant evaporation temperature, and the laser heat absorbers are cooled based on the coolant latent heat effect.

If the coolant that has not fully vaporized flows into the coolant compressor, the coolant adversely affects the coolant compressor. To avoid the problem, the coolant heater heats the coolant before it flows into the coolant compressor.

In the configuration described above, in the portion of the coolant path from the one end of the electronic expansion valve to the coolant heater via the laser heat absorbers, the coolant latent heat effect keeps the temperatures of the laser heat absorbers and other components at a fixed temperature. The cooling apparatus can thus cool, via the coolant that circulates along the coolant path, the laser heat absorbers and in turn the RGB laser clusters to a certain fixed temperature.

However, the projector described in JP-A-2015-132659, which includes the outdoor unit coupled to the indoor unit via the coolant tubes and the communication line, has a problem of complicated installation of the projector.

SUMMARY

A projector according to an aspect of the present disclosure is a projector that modulates light emitted from a light source and projects the modulated light, the projector including an exterior housing forming an exterior of the projector, a first cooling target, and a cooling apparatus provided in the exterior housing and configured to cool the first cooling target. The cooling apparatus includes a first tube, a second tube, a third tube, and a fourth tube, a first compressor configured to compress an operating fluid in a gas phase, a condenser coupled to the first compressor via the first tube and configured to condense the gas-phase operating fluid compressed by the first compressor into the operating fluid in a liquid phase, a first expander coupled to the condenser via the second tube and configured to decompress the liquid-phase operating fluid condensed by the condenser to change to the operating fluid in which the liquid phase and the gas phase are mixed with each other, and a first evaporator coupled to the first expander via the third tube, configured to change a portion of the liquid-phase operating fluid supplied from the first expander to the gas-phase operating fluid by using heat transferred from the first cooling target, and configured to discharge the gas-phase operating fluid to the first compressor coupled via the fourth tube.

In the aspect described above, the projector may further include a second cooling target managed to have a second temperature different from a first temperature that is a managed temperature of the first cooling target. The cooling apparatus may further include a fifth tube and a sixth tube, a second expander configured to decompress another portion of the liquid-phase operating fluid supplied from the first expander via the third tube, a second evaporator coupled to the second expander via the fifth tube and configured to change the liquid-phase operating fluid supplied from the second expander to the gas-phase operating fluid by using heat transferred from the second cooling target, and a second compressor coupled to the first compressor via the fourth tube, coupled to the second evaporator via the sixth tube, and configured to compress the gas-phase operating fluid supplied from the second evaporator. The third tube may include a flow dividing tube configured to divide the operating fluid supplied from the first expander, a first branch tube configured to conduct, to the first evaporator, a portion of the operating fluid divided from the operating fluid flowing through the flow dividing tube, and a second branch tube configured to conduct, to the second evaporator, another portion of the operating fluid divided from the operating fluid flowing through the flow dividing tube via the second expander and the fifth tube. The fourth tube may include a third branch tube coupled to the first evaporator, a fourth branch tube coupled to the second compressor, and a flow merging tube configured to merge the operating fluid supplied from the first evaporator via the third branch tube with the operating fluid supplied from the second compressor via the fourth branch tube and configured to conduct the merged operating fluid to the first compressor.

In the aspect described above, the second temperature may be lower than the first temperature.

In the aspect described above, a pressure of the gas-phase operating fluid compressed by the second compressor may be substantially equal to a pressure of the gas-phase operating fluid to be discharged from the first evaporator.

In the aspect described above, an amount of heat generated by the first cooling target may be greater than an amount of heat generated by the second cooling target, and a flow rate of the liquid-phase operating fluid supplied to the first evaporator may be greater than a flow rate of the liquid-phase operating fluid supplied to the second evaporator.

In the aspect described above, the projector may further include a light modulator configured to modulate the light emitted from the light source, the first cooling target may include the light source, and the second cooling target may include the light modulator.

In the aspect described above, the projector may further include a casing in which the second cooling target and the second evaporator are disposed and a circulation fan that circulates a cooling gas in the casing, and the second evaporator may change the liquid-phase operating fluid to the gas-phase operating fluid by using heat transferred from the second cooling target and carried by the cooling gas.

In the aspect described above, the first cooling target may include a first light source configured to emit light which belongs to a first wavelength band, and the second cooling target may include a second light source configured to emit light which belongs to a second wavelength band different from the first wavelength band.

DESCRIPTION OF EXEMPLARY EMBODIMENTS

First Embodiment

Figure 1:
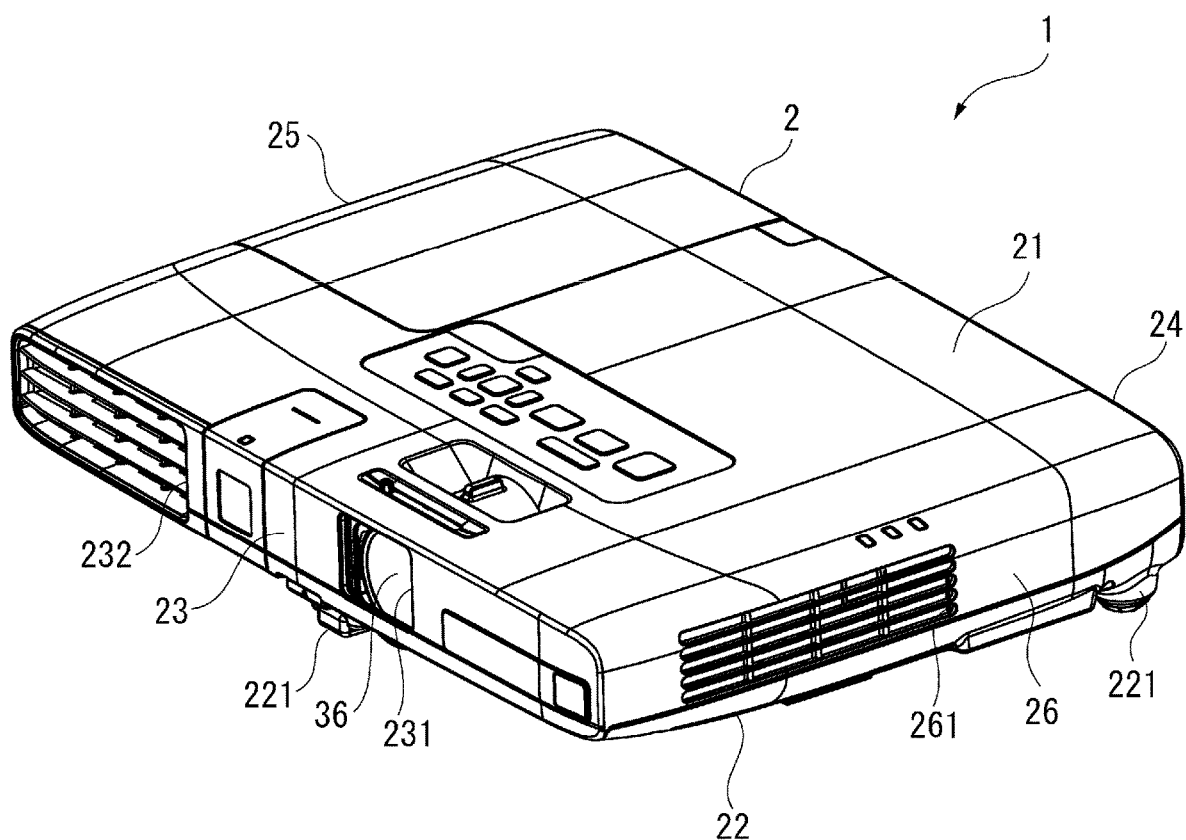
FIG. 1 is a perspective view showing the exterior appearance of a projector in a first embodiment.

A first embodiment of the present disclosure will be described below with reference to the drawings.
Schematic Configuration of Projector FIG. 1 is a perspective view showing the exterior appearance of a projector 1 according to the present embodiment.

The projector 1 according to the present embodiment is an image display apparatus that modulates light outputted from a light source apparatus 4, which will be described later, to form an image according to image information, enlarges the formed image, and projects the enlarged image on a projection receiving surface, such as a screen. The projector 1 includes an exterior housing 2, which forms the exterior of the projector 1, as shown in FIG. 1.
Configuration of Exterior Housing The exterior housing 2 includes a top surface section 21, a bottom surface section 22, a front surface section 23, a rear surface section 24, a left side surface section 25, and aright side surface section 26 and has a substantially box-like shape.

The bottom surface section 22 includes a plurality of legs 221, which are in contact with an installation surface on which the projector 1 is placed.

The front surface section 23 is located on a side of the exterior housing 2 that is the side facing a projected image. The front surface section 23 has an opening 231, which exposes part of a projection optical apparatus 36, which will be described later, and an image projected by the projection optical apparatus 36 passes through the opening 231. The front surface section 23 has a discharge port 232, via which a cooling gas having cooled a cooling target in the projector 1 is discharged out of the exterior housing 2.

The right side surface section 26 has an introduction port 261, via which a gas, such as the air outside the exterior housing 2, is introduced as the cooling gas into the exterior housing 2.
Internal Configuration of Projector FIG. 2 is a diagrammatic view showing the internal configuration of the projector 1.

Figure 2:
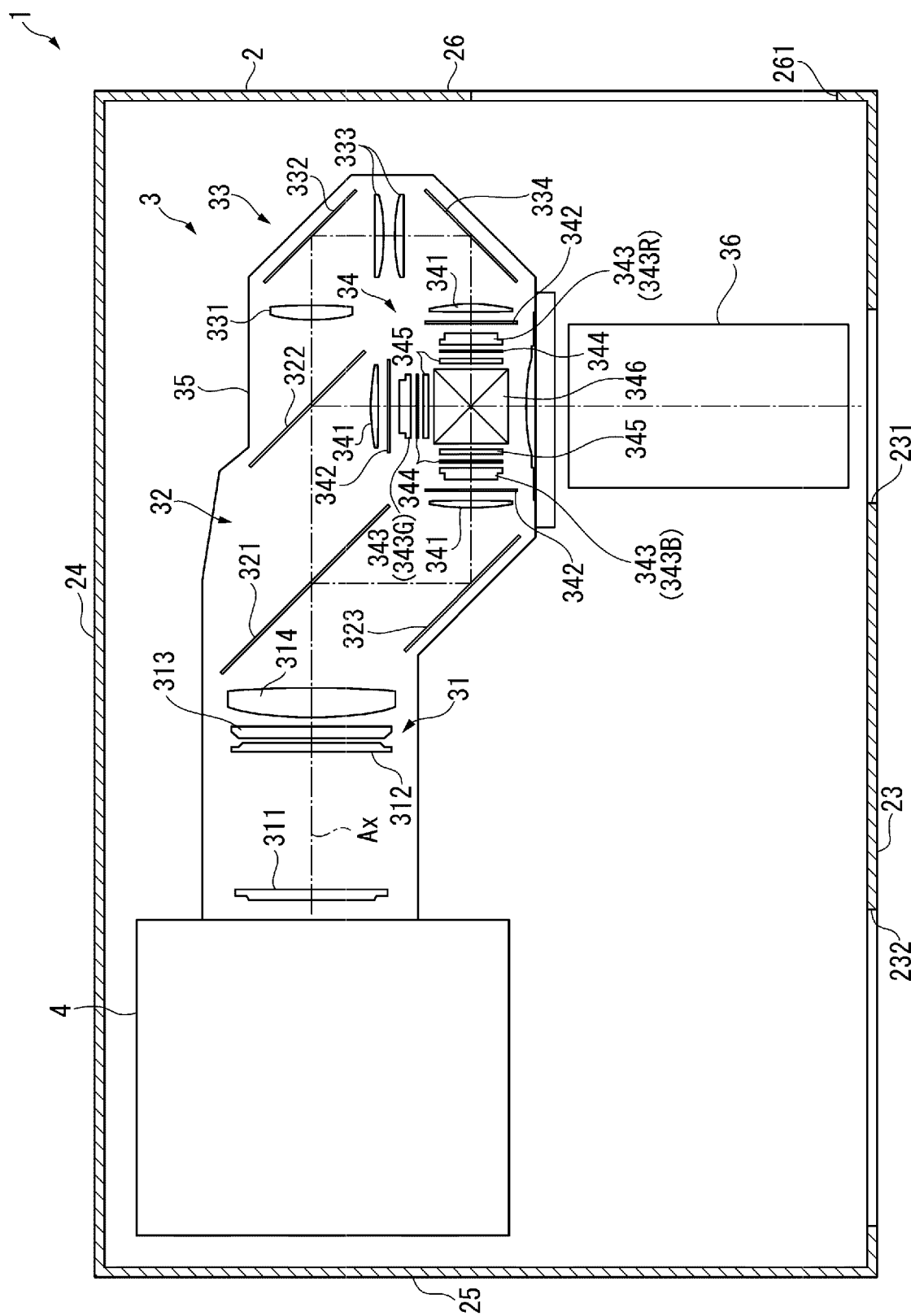
FIG. 2 is a diagrammatic view showing the internal configuration of the projector in the first embodiment.

The projector 1 further includes an image projection apparatus 3, which is accommodated in the exterior housing 2, as shown in FIG. 2. Although not shown in FIG. 2, the projector 1 further includes a cooling apparatus 5 (see FIG. 4), which cools a cooling target, a control apparatus that controls the operation of the projector 1, and a power supply apparatus that supplies electronic parts of the projector 1 with electric power.
Configuration of Image Projection Apparatus The image projection apparatus 3 forms and projects an image according to image information inputted from the control apparatus. The image projection apparatus 3 includes the light source apparatus 4, a homogenizing apparatus 31, a color separation apparatus 32, a relay apparatus 33, an image formation apparatus 34, an optical part housing 35, and the projection optical apparatus 36.

The light source apparatus 4 outputs illumination light. The configuration of the light source apparatus 4 will be described later in detail.

The homogenizing apparatus 31 homogenizes the illumination light outputted from the light source apparatus 41. The homogenized illumination light travels via the color separation apparatus 32 and the relay apparatus 33, and a modulation area of each of light modulators 343, which will be described later, is illuminated with the homogenized illumination light. The homogenizing apparatus 31 includes two lens arrays 311 and 312, a polarization conversion element 313, and a superimposing lens 314.

The color separation apparatus 32 separates the light incident from the homogenizing apparatus 31 into red light, green light, and blue light. The color separation apparatus 32 includes two dichroic mirrors 321 and 322 and a reflection mirror 323, which reflects the blue light separated by the dichroic mirror 321.

The relay apparatus 33 is provided in the optical path of the red light, which is longer than the optical paths of the other color light, and suppresses loss of the red light. The relay apparatus 33 includes a light-incident-side lens 331, relay lenses 333, and reflection mirrors 332 and 334. In the present embodiment, the red light is the color light having an optical path longer than those of the other light, and the relay apparatus 33 is provided in the optical path of the red light, but not necessarily. For example, the blue light may be the color light having an optical path longer than those of the other light, and the relay apparatus 33 may be provided in the optical path of the blue light.

The image formation apparatus 34 modulates the red light, the green light, and the blue light incident thereon and combines the modulated color light fluxes with one another to form an image. The image formation apparatus 34 includes three field lenses 341, three light-incident-side polarizers 342, three light modulators 343, three viewing angle compensators 344, and three light-exiting-side polarizers 345, which are provided in accordance with the color light fluxes that enter the image formation apparatus 34, and further includes one light combiner 346.

The light modulators 343 each modulate the light outputted from the light source apparatus 4 in accordance with image information. The light modulators 343 include a light modulator 343R for red light, a light modulator 343G for green light, a light modulator 343B for blue light. In the present embodiment, the light modulators 343 are each formed of a transmissive liquid crystal panel, and the light-incident-side polarizers 342, the light modulators 343, and the light-exiting-side polarizers 345 form liquid crystal light valves.

The light combiner 346 combines the color light fluxes modulated by the light modulators 343B, 343G, and 343R with one another to form an image. In the present embodiment, the light combiner 346 is formed of a cross dichroic prism, but not necessarily, and can be formed, for example, of a plurality of dichroic mirrors.

The optical part housing 35 accommodates the apparatuses 31 to 34 described above. An illumination optical axis Ax, which is the optical axis in the design stage, is set in the image projection apparatus 3, and the optical part housing 35 holds the apparatuses 31 to 34 in predetermined positions along the illumination optical axis Ax. The light source apparatus 4 and the projection optical apparatus 36 are disposed in predetermined positions on the illumination optical axis Ax.

Although will be described later, the projector 1 includes a sealed casing SC (see FIG. 4), part of which is formed of the optical part housing 35. The sealed casing SC accommodates the light-incident-side polarizers 342, the light modulators 343, the viewing angle compensators 344, the light-exiting-side polarizers 345, and the light combiner 346, which form the image formation apparatus 34. The light-incident-side polarizers 342, the light modulators 343, the viewing angle compensators 344, the light-exiting-side polarizers 345, and the light combiner 346 are cooled by a cooling gas that circulates in the sealed casing SC. The cooling gas in the sealed casing SC is cooled by a second evaporator 56 (see FIG. 4), which is one of the members that form the cooling apparatus 5 and is disposed in the sealed casing SC.

The projection optical apparatus 36 enlarges the image incident from the image formation apparatus 34 and projects the enlarged image on the projection receiving surface. That is, the projection optical apparatus 36 projects the light fluxes modulated by the light modulators 343B, 343G, and 343R. The projection optical apparatus 36 is configured, for example, as a unit lens formed of a plurality of lenses accommodated in a tubular barrel.

Configuration of Light Source Apparatus

Figure 3:
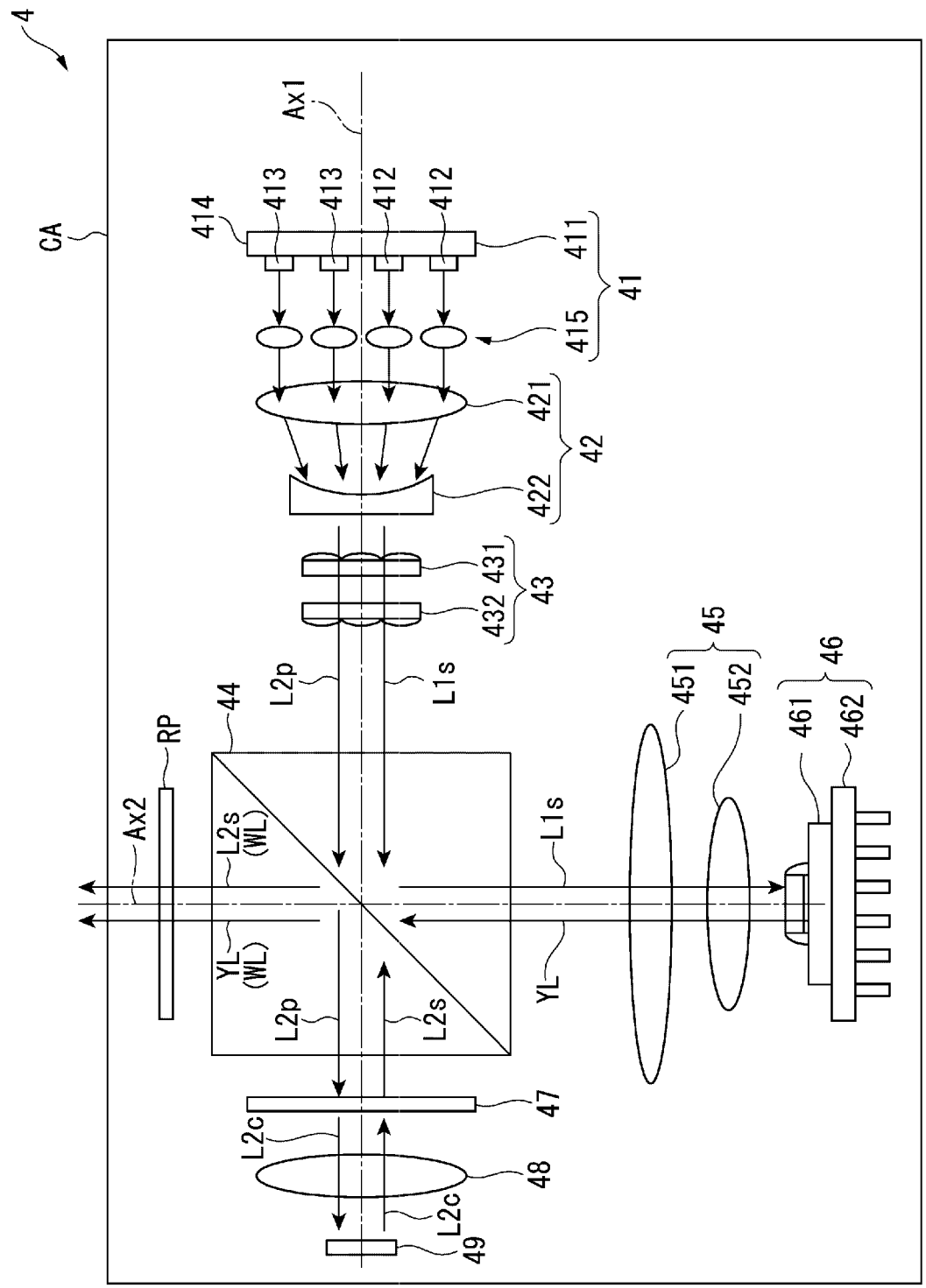
FIG. 3 is a diagrammatic view showing the configuration of a light source apparatus in the first embodiment.

FIG. 3 is a diagrammatic view showing the configuration of the light source apparatus 4.

The light source apparatus 4 outputs the illumination light to the homogenizing apparatus 31. The light source apparatus 4 includes a light source housing CA and the following components accommodated in the light source housing CA: a light source section 41; an afocal optical element 42; a homogenizer optical element 43; a polarization separation element 44; a first light collection element 45; a wavelength conversion element 46; a first retardation element 47; a second light collection element 48; a diffusive reflector 49; and a second retardation element RP, as shown in FIG. 3.

The light source housing CA is configured as a sealed casing that dust and other foreign matter are unlikely to enter.

The light source section 41, the afocal optical element 42, the homogenizer optical element 43, the polarization separation element 44, the first retardation element 47, the second light collection element 48, and the diffusive reflector 49 are arranged along an illumination optical axis Ax1 set in the light source apparatus 4.

The wavelength conversion element 46, the first light collection element 45, the polarization separation element 44, and the second retardation element RP are arranged along an illumination optical axis Ax2, which is set in the light source apparatus 4 and perpendicular to the illumination optical axis Ax1. The illumination optical axis Ax2 coincides with the illumination optical axis Ax in the position of the lens array 311. In other words, the illumination optical axis Ax2 is set as an extension of the illumination optical axis Ax.

Configuration of Light Source Section

The light source section 41 includes a light source 411, which outputs light, and collimator lenses 415.

The light source 411 includes a plurality of first semiconductor lasers 412, a plurality of second semiconductor lasers 413, and a support member 414.

The first semiconductor lasers 412 each output s-polarized blue light L1s, which is excitation light. The blue light L1s is, for example, laser light having a peak wavelength of 440 nm. The blue light L1s outputted from each of the first semiconductor lasers 412 enters the wavelength conversion element 46.

The second semiconductor lasers 413 each output p-polarized blue light L2p. The blue light L2p is, for example, laser light having a peak wavelength of 460 nm. The blue light L2p outputted from each of the second semiconductor lasers 413 enters the diffusive reflector 49.

The support member 414 supports the plurality of first semiconductor lasers 412 arranged in an array in a plane perpendicular to the illumination optical axis Ax1 and the plurality of second semiconductor lasers 413 arranged in an array in the plane. The support member 414 is a member made of a thermally conductive metal and is coupled to a first evaporator 54, which will be described later, via a heat transfer member TM. Heat generated by the semiconductor lasers 412 and 413, which are each a heat source, that is, heat generated in the light source 411 is transferred to the first evaporator 54, whereby the light source 411 is cooled.

The blue light L1s outputted from each of the first semiconductor lasers 412 and the blue light L2p outputted from each of the second semiconductor lasers 413 are each converted by the corresponding collimator into a parallelized light flux lens 415, which enters the afocal optical element 42.

In the present embodiment, the light source 411 is configured to output the s-polarized blue light L1s and the p-polarized blue light L2p, but not necessarily. The light source 411 may be configured to output linearly polarized blue light fluxes having the same polarization direction. In this case, a retardation element that converts the linearly polarized light of one type incident thereon into light containing s-polarized light and p-polarized light may be disposed between the light source section 41 and the polarization separation element 44.

Configuration of Afocal Optical Element and Homogenizer Optical Element

The afocal optical element 42 adjusts the light flux diameters of the blue light L1s and L2p incident from the light source section 41 and causes the adjusted blue light L1s and L2p to enter the homogenizer optical element 43. The afocal optical element 42 is formed of a lens 421, which collects the light incident thereon, and a lens 422, which parallelizes the collected light flux from the lens 421.

The homogenizer optical element 43 homogenizes the illuminance distributions of the blue light L1s and L2p. The homogenizer optical element 43 is formed of a pair of multi-lens arrays 431 and 432.

Configuration of Polarization Separation Element

The blue light L1s and L2p having passed through the homogenizer optical element 43 enter the polarization separation element 44.

The polarization separation element 44 is a prism-shaped polarization beam splitter and separates the s-polarized component and the p-polarized component contained in the light incident thereon from each other. Specifically, the polarization separation element 44 reflects the s-polarized component and transmits the p-polarized component. The polarization separator 44 has a color separation characteristic that causes the polarization separation element 44 to transmit light having wavelengths longer than or equal to a predetermined value irrespective of the type of the polarized component, the s-polarized component or the p-polarized component. The s-polarized blue light L1s is therefore reflected off the polarization separation element 44 and enters the first light collection element 45. On the other hand, the p-polarized blue light L2p passes through the polarization separation element 44 and enters the first retardation element 47.

Configuration of First Light Collection Element

The first light collection element 45 collects the blue light L1s reflected off the polarization separation element 44 into a spot at the wavelength conversion element 46. The first light collection element 45 parallelizes fluorescence YL incident from the wavelength conversion element 46. In the example shown in FIG. 3, the first light collection element 45 is formed of two lenses 451 and 452, but the number of lenses that form the first light collection element 45 is not limited to a specific number.

Configuration of Wavelength Conversion Element

The wavelength conversion element 46, when excited by the light incident thereon, generates the fluorescence YL having a wavelength longer than the wavelength of the incident light and outputs the fluorescence YL to the first light collection element 45. In other words, the wavelength conversion element 46 converts the wavelength of the light incident thereon and outputs the converted light. The fluorescence YL generated by the wavelength conversion element 46 is light having a peak wavelength ranging, for example, from 500 to 700 nm. The wavelength conversion element 46 includes a wavelength converter 461 and a heat dissipator 462.

The wavelength converter 461 has, although not shown, a wavelength conversion layer and a reflection layer. The wavelength conversion layer contains a phosphor that diffusively emits the fluorescence YL, which is the result of wavelength conversion of the blue light L1s incident on the wavelength conversion layer and is non-polarized light. The reflection layer reflects the fluorescence YL incident from the wavelength conversion layer toward the first light collection element 45.

The heat dissipator 462 is provided on a side of the wavelength converter 461 that is the surface opposite the light incident side and dissipates heat generated in the wavelength converter 461.

The fluorescence YL outputted from the wavelength conversion element 46 passes through the first light collection element 45 along the illumination optical axis Ax2 and then enters the polarization separation element 44 having the color separation characteristic described above. The fluorescence YL then passes through the polarization separation element 44 along the illumination optical axis Ax2 and enters the second retardation element RP.

The wavelength conversion element 46 may be rotated by a rotator, such as a motor, around an axis of rotation parallel to the illumination optical axis Ax2.

Configurations of First Retardation Element and Second Light Collection Element

The first retardation element 47 is disposed between the polarization separation element 44 and the second light collection element 48. The first retardation element 47 converts the blue light L2p having passed through the polarization separation element 44 into circularly polarized blue light L2c. The blue light L2c enters the second light collection element 48.

The second light collection element 48 collects the blue light L2c incident from the first retardation element 47 into a spot at the diffusive reflector 49. The second light collection element 48 parallelizes the blue light L2c incident from the diffusive reflector 49. The number of lenses that form the second light collection element 48 can be changed as appropriate.

Configuration of Diffusive Reflector

The diffusive reflector 49 diffusively reflects the blue light incident thereon L2c at the same angle of diffusion at which the fluorescence YL generated by the wavelength conversion element 46 is emitted therefrom. The configuration of the diffusive reflector 49 can, for example, be a configuration including a reflection plate that reflects the blue light L2c incident thereon in the Lambertian scheme and a rotator that rotates the reflection plate around an axis of rotation parallel to the illumination optical axis Ax1.

The blue light L2c diffusively reflected off the diffusive reflector 49 passes through the second light collection element 48 and then enters the first retardation element 47. When reflected off the diffusive reflector 49, the blue light L2c is converted into circularly polarized light rotating in the direction opposite the direction in which the blue light L2c rotates before incident on the diffusive reflector 49. The blue light L2c having entered the first retardation element 47 via the second light collection element 48 is therefore converted into s-polarized blue light L2s instead of the p-polarized blue light L2p incident from the polarization separation element 44 on the first retardation element 47. The blue light L2s is then reflected off the polarization separation element 44 and enters the second retardation element RP. That is, the light incident from the polarization separation element 44 on the second retardation element RP is white light that is the mixture of the blue light L2s and the fluorescence YL.

Configuration of Second Retardation Element

The second retardation element RP converts the white light incident from the polarization separation element 44 into light containing s-polarized light and p-polarized light mixed with each other. White illumination light WL as a result of the conversion described above enters the homogenizing apparatus 31 described above.

Configuration of Cooling Apparatus

Figure 4:
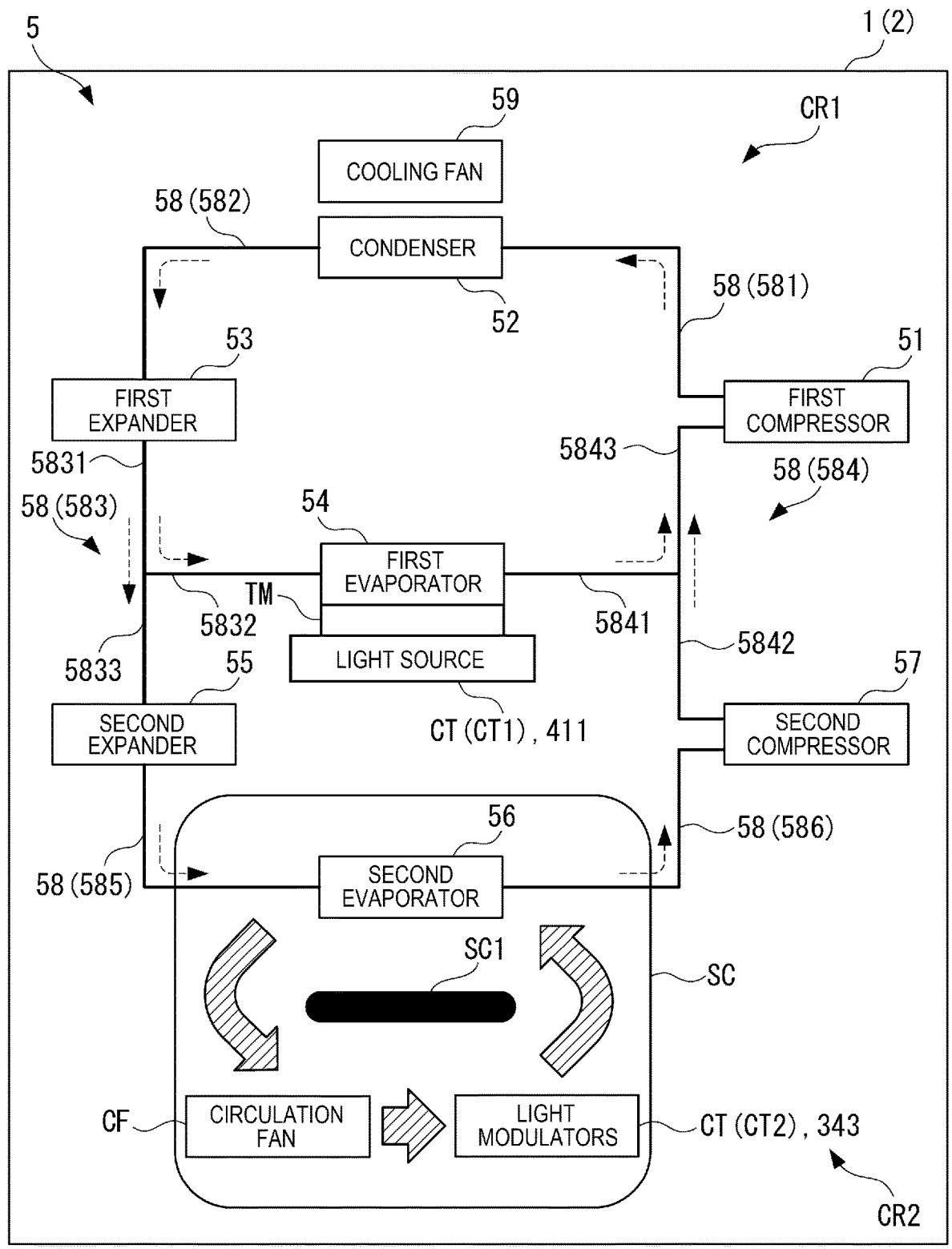
FIG. 4 is a diagrammatic view showing the configuration of a cooling apparatus in the first embodiment.

FIG. 4 is a diagrammatic view showing the cooling apparatus 5. In FIG. 4, the direction in which an operating fluid flows is indicated by the dotted-line arrows, and the direction in which the cooling gas flows in the sealed casing SC is indicated by the hatched arrows.

The cooling apparatus 5 is provided in the exterior housing 2 and cools a cooling target CT, which forms the projector 1, as shown in FIG. 4. Specifically, the cooling apparatus 5 circulates the operating fluid that changes in terms of phase between the liquid phase and the gas phase to cool the cooling target CT. The cooling target CT includes a first cooling target CT1 and a second cooling target CT2. The first cooling target CT1 is a cooling target managed to have a first temperature and includes the light source 411 in the present embodiment. The second cooling target CT2 is a cooling target managed to have a second temperature lower than the first temperature and includes the light modulators 343 in the present embodiment.

The first temperature, which is the managed temperature of the first cooling target CT1, and the second temperature, which is the managed temperature of the second cooling target CT2, each have a predetermined temperature range. The first cooling target CT1 is managed to have a temperature within a first temperature range, and the second cooling target CT2 is managed to have a temperature within a second temperature range. The lower limit of the first temperature range may be lower than the upper limit of the second temperature range. In this case, the median of the first temperature range may be greater than the median of the second temperature range.

The cooling apparatus 5 includes a first compressor 51, a condenser 52, a first expander 53, the first evaporator 54, a second expander 55, the second evaporator 56, and a second compressor 57 and further includes a tube 58, which couples the components described above to each other to allow the operating fluid to flow therethrough, and a cooling fan 59.

Configuration of Tube

The tube 58 includes a first tube 581, a second tube 582, a third tube 583, a fourth tube 584, a fifth tube 585, and a sixth tube 586.

The first tube 581 couples the first compressor 51 to the condenser 52, and the second tube 582 couples the condenser 52 to the first expander 53. The third tube 583 couples the first expander 53 to the first evaporator 54 and the second expander 55, and the fourth tube 584 couples the first evaporator 54 and the second expander 55 to the first compressor 51. The fifth tube 585 couples the second expander 55 to the second evaporator 56, and the sixth tube 586 couples the second evaporator 56 to the second compressor 57.

The third tube 583 includes a flow dividing tube 5831 and branch tubes 5832 and 5833.

The flow dividing tube 5831 couples the first expander 53 to the branch tubes 5832 and 5833. The flow dividing tube 5831, through which the operating fluid flowing from the first expander 53 flows, divides the operating fluid toward the first evaporator 54 and the second expander 55.

The branch tube 5832 couples the flow dividing tube 5831 to the first evaporator 54. The branch tube 5832 causes part of the operating fluid divided from the operating fluid flowing through the flow dividing tube 5831 to flow to the first evaporator 54. The branch tube 5832 corresponds to a first branch tube.

The branch tube 5833 couples the flow dividing tube 5831 to the second expander 55. The branch tube 5833 causes the other part of the operating fluid divided from the operating fluid flowing through the flow dividing tube 5831 to flow to the second evaporator 56 via the second expander 55 and the fifth tube 585. The branch tube 5833 corresponds to a second branch tube.

The fourth tube 584 includes branch tubes 5841 and 5842 and a flow merging tube 5843.

The branch tube 5841 couples the first evaporator 54 to the flow merging tube 5843. The branch tube 5841 causes the operating fluid flowing from the first evaporator 54 to flow to the flow merging tube 5843. The branch tube 5841 corresponds to a third branch tube.

The branch tube 5842 couples the second compressor 57 to the flow merging tube 5843. The branch tube 5842 causes the operating fluid flowing from the second compressor 57 to flow to the flow merging tube 5843. The branch tube 5842 corresponds to a fourth branch tube.

The flow merging tube 5843 couples the branch tubes 5841 and 5842 to the first compressor 51. The flow merging tube 5843 merges the operating fluid flowing from the first evaporator 54 via the branch tube 5841 with the operating fluid flowing from the second compressor 57 via the branch tube 5842 and causes the merged flow to flow to the first compressor 51.

Configuration of First Compressor

The first compressor 51 compresses the operating fluid in the gas phase. That is, the first compressor 51 compresses the gas-phase operating fluid flowing via the fourth tube 584 to raise the temperature and pressure of the gas-phase operating fluid. The gas-phase operating fluid having a temperature and pressure raised by the first compressor 51 flows to the condenser 52 via the first tube 581.

Configuration of Condenser

The condenser 52 is coupled to the first compressor 51 via the first tube 581. The condenser 52 condenses the gas-phase operating fluid compressed by the first compressor 51, that is, the gas-phase operating fluid having the raised temperature and pressure into the operating fluid in the liquid phase. Specifically, the condenser 52 performs heat exchange between the compressed gas-phase operating fluid and the cooling gas introduced from the space outside the exterior housing 2 thereinto and flowing to the condenser 52 via the cooling fan 59 to condense the gas-phase operating fluid into high-pressure liquid-phase operating fluid.

Configuration of First Expander

The first expander 53 is a decompressor and is coupled to the condenser 52 via the second tube 582. The first expander 53 decompresses the liquid-phase operating fluid condensed by the condenser 52 to change the state of the operating fluid to a state in which the liquid phase and the gas phase are mixed with each other. That is, the first expander 53 lowers the temperature of the operating fluid. The thus functioning first expander 53 can be a capillary tube or an electronic expansion valve capable of controlling the evaporating temperature of the gas-phase operating fluid.

Configuration of First Evaporator

The first evaporator 54 is coupled to the first expander 53 via the third tube 583. In detail, the first evaporator 54 is coupled to the first expander 53 via the flow dividing tube 5831 and the branch tube 5832. Part of the operating fluid having the state in which the liquid phase and the gas phase are mixed with each other flows from the first expander 53 into the first evaporator 54. That is, part of the liquid-phase operating fluid flowing from the first expander 53 flows to the first evaporator 54.

The first evaporator 54 is coupled to the support member 414 of the light source 411 via the heat transfer member TM, and the heat generated in the plurality of first semiconductor lasers 412 and the plurality of second semiconductor lasers 413 is transferred to the first evaporator 54 via the support member 414 and the heat transfer member TM. That is, the heat of the light source 411 is transferred to the first evaporator 54.

The first evaporator 54 evaporates part of the liquid-phase operating fluid flowing from the first expander into the gas-phase operating fluid by using the heat transferred from the light source 411. The heat of the plurality of first semiconductor lasers 412 and the plurality of second semiconductor lasers 413 is thus consumed, whereby the plurality of first semiconductor lasers 412 and the plurality of second semiconductor lasers 413 are cooled.

The first evaporator 54 is coupled to the first compressor 51 via the branch tube 5841 and the flow merging tube 5843 of the fourth tube 584. The first evaporator 54 discharges the gas-phase operating fluid to which the liquid-phase operating fluid has changed to the first compressor 51 via the fourth tube 584.

The cooling apparatus 5 thus includes a first circulation path CR1, which causes the operating fluid to sequentially flow through the first compressor 51, the first tube 581, the condenser 52, the second tube 582, the first expander 53, the third tube 583, the first evaporator 54, and the fourth tube 584 and then flow into the first compressor 51 again. As described above, the first circulation path CR1 cools the light source 411, which belongs to the first cooling target CT1.

Configuration of Second Expander

The second expander 55 is a decompressor and is coupled to the first expander 53 via the third tube 583. In detail, the second expander 55 is coupled to the first expander 53 via the flow dividing tube 5831 and the branch tube 5833 of the third tube 583. The other part of the operating fluid having the state in which the liquid phase and the gas phase are mixed with each other flows from the first expander 53 into the second expander 55.

The second expander 55 further decompresses the other part of the operating fluid flowing from the first expander 53 via the flow dividing tube 5831 and the branch tube 5833, that is, the operating fluid having the state in which the liquid phase and the gas phase are mixed with each to further lower the temperature of the operating fluid. The thus functioning second expander 55 can be a capillary tube or an electronic expansion valve, as in the case of the first expander 53.

Configuration of Second Evaporator

The second evaporator 56 is coupled to the second expander 55 via the fifth tube 585. The operating fluid decompressed by the second expander 55 flows to the second evaporator 56 via the fifth tube 585.

The second evaporator 56 is provided in the sealed casing SC, in which the light-incident-side polarizers 342, the light modulators 343, the viewing angle compensators 344, the light-exiting-side polarizers 345, and the light combiner 346 are disposed as described above. That is, the projector 1 includes the sealed casing SC, in which the second cooling target CT2 and the second evaporator 56 are disposed. The second evaporator 56 evaporates the liquid-phase operating fluid flowing from the second expander 55 into the gas-phase operating fluid by using the heat received from at least one heat source out of the light-incident-side polarizers 342, the light modulators 343, the viewing angle compensators 344, the light-exiting-side polarizers 345, and the light combiner 346 and carried by the cooling gas in the sealed casing SC, that is, the heat transferred from the second cooling target CT2. The second evaporator 56 thus cools the cooling gas in the sealed casing SC. That is, the operating fluid flowing out of the second evaporator 56 is the gas-phase operating fluid. The second evaporator 56 discharges the gas-phase operating fluid to the sixth tube 586.

The projector 1 further includes a circulation fan CF, which circulates the cooling gas in the sealed casing SC in the sealed casing SC. Further, a partition wall SC1 is provided in the sealed casing SC, and the circulation fan CF circulates the cooling gas cooled by the second evaporator 56 in the sealed casing SC along an air circulation channel formed by the partition wall SC1. The configuration of the image formation apparatus 34 in the sealed casing SC, for example, the light modulators 343 and the light-exiting-side polarizers 345 are cooled by the cooling gas cooled by the second evaporator 56.

Configuration of Second Compressor

The second compressor 57 is coupled to the second evaporator 56 via the sixth tube 586. The second compressor 57 is further coupled to the first compressor 51 via the fourth tube 584.

The second compressor 57 compresses the gas-phase operating fluid flowing from the second evaporator 56 via the sixth tube 586. The second compressor 57 thus raises the temperature and pressure of the gas-phase operating fluid. The gas-phase operating fluid compressed by the second compressor 57 flows through the branch tube 5842 of the fourth tube 584 and merges with the gas-phase operating fluid flowing through the branch tube 5841 in the flow merging tube 5843, and the resultant gas-phase operating fluid flows to the first compressor 51.

The second compressor 57 compresses the gas-phase operating fluid flowing from the second evaporator 56 in such away that the pressure of the gas-phase operating fluid flowing from the second compressor 57 into the branch tube 5842 of the fourth tube 584 is substantially equal to the pressure of the gas-phase operating fluid flowing from the first evaporator 54 into the branch tube 5841 of the fourth tube 584. That is, the pressure of the gas-phase operating fluid compressed by the second compressor 57 is substantially equal to the pressure of the gas-phase operating fluid discharged from the first evaporator 54. The gas-phase operating fluid flowing from the second compressor 57 through the branch tube 5842 and the gas-phase operating fluid flowing from the first evaporator 54 through the branch tube 5841 thus merge with each other in the flow merging tube 5843, and the resultant gas-phase operating fluid is readily allowed to flow to the first compressor 51.

In the present embodiment, the amount of heat generated by the first cooling target CT1 including the light source 411 is greater than the amount of heat generated by the second cooling target CT2 including the light modulators 343. The flow dividing tube 5831 therefore causes the flow rate of the liquid-phase operating fluid supplied to the first evaporator 54 via the branch tube 5832 to be greater than the flow rate of the liquid-phase operating fluid supplied to the second evaporator 56 via the branch tube 5833, the second expander 55, the fifth tube 585. The first cooling target CT1, which generates a greater amount of heat than the amount of heat generated by the second cooling target CT2, can be readily managed to have the first temperature.

As described above, the cooling apparatus 5 has a second circulation path CR2, which causes the operating fluid to sequentially flow through the first compressor 51, the first tube 581, the condenser 52, the second tube 582, the first expander 53, the third tube 583, the second expander 55, the fifth tube 585, the second evaporator 56, the sixth tube 586, the second compressor 57, and the fourth tube 584 and then flow into the first compressor 51 again. The second circulation path CR2 shares the path from the flow merging tube 5843 of the fourth tube 584 to the flow dividing tube 5831 of the third tube 583 with the first circulation path CR1 described above. As described above, the second circulation path CR2 cools the light modulators 343 and other components, which belong to the second cooling target CT2.

As described above, in the cooling apparatus 5 in the present embodiment, the first evaporator 54 can draw the heat generated in the plurality of first semiconductor lasers 412 and the plurality of second semiconductor lasers 413 to cool the light source 411, and the second evaporator 56 can draw the heat of the cooling gas in the sealed casing SC to cool the cooling gas and in turn cool the image formation apparatus 34 including the light modulators 343. The two cooling targets can therefore be cooled.

Effects of First Embodiment

The projector 1 according to the present embodiment described above can provide the following effects.

The projector 1 modulates the light outputted from the light source 411 and projects the modulated light. The projector 1 includes the exterior housing 2, which forms the exterior of the projector 1, the first cooling target CT1 including the light source 411, and the cooling apparatus 5, which is provided in the exterior housing 2 and cools the light source 411. The cooling apparatus 5 includes the first tube 581, the second tube 582, the third tube 583, the fourth tube 584, the first compressor 51, the condenser 52, the first expander 53, and the first evaporator 54.

The first compressor 51 compresses the gas-phase operating fluid. The condenser 52 is coupled to the first compressor 51 via the first tube 581 and condenses the gas-phase operating fluid compressed by the first compressor 51 into the liquid-phase operating fluid. The first expander 53 is coupled to the condenser 52 via the second tube 582 and decompresses the liquid-phase operating fluid condensed by the condenser 52 to change the state of the operating fluid to the state in which the liquid phase and the gas phase are mixed with each other. The first evaporator 54 is coupled to the first expander 53 via the third tube 583, changes part of the liquid-phase operating fluid flowing from the first expander 53 to the gas-phase operating fluid by using the heat transferred from the light source 411, and discharges the gas-phase operating fluid to which the liquid-phase operating fluid has been changed to the first compressor 51 via the fourth tube 584.

According to the configuration described above, the operating fluid circulating along the first cooling target CT1 can cool the light source 411, which belongs to the first cooling target CT1. The cooling apparatus 5 is provided in the exterior housing 2. Therefore, the projector 1 can be readily installed, and the exterior appearance of the projector 1 can be improved, as compared with a case where part of the cooling apparatus 5 is provided outside the exterior housing 2. Further, the size of the projector 1 can be reduced, whereby the projector 1 can be readily carried.

The projector 1 includes the second cooling target CT2, which is managed to have the second temperature different from the first temperature, which is the managed temperature of the first cooling target CT1, and the second cooling target CT2 includes the light modulators 343. The cooling apparatus 5 further includes the fifth tube 585, the sixth tube 586, the second expander 55, the second evaporator 56, and the second compressor 57. The second expander 55 decompresses the other part of the liquid-phase operating fluid flowing from the first expander 53 via the third tube 583. The second evaporator 56 is coupled to the second expander 55 via the fifth tube 585 and changes the liquid-phase operating fluid flowing from the second expander 55 to the gas-phase operating fluid by using the heat transferred from the light modulators 343. The second compressor 57 is coupled to the first compressor 51 via the fourth tube 584, is further coupled to the second evaporator 56 via the sixth tube 586, and compresses the gas-phase operating fluid flowing from the second evaporator 56.

The third tube 583 includes the flow dividing tube 5831, which divides the operating fluid flowing from the first expander 53, the branch tube 5832, which serves as the first branch tube that causes part of the operating fluid divided from the operating fluid flowing through the flow dividing tube 5831 to flow to the first evaporator 54, and the branch tube 5833, which serves as the second branch tube that causes the other part of the operating fluid divided from the operating fluid flowing through the flow dividing tube 5831 to flow to the second evaporator 56 via the second evaporator 55 and the fifth tube 585. The fourth tube 584 includes the branch tube 5841, which serves as the third branch tube coupled to the first evaporator 54, the branch tube 5842, which serves as the fourth branch coupled to the second compressor 57, and the flow merging tube 5843, which merges the operating fluid flowing from the first evaporator 54 via the branch tube 5841 with the operating fluid flowing from the second compressor 57 via the branch tube 5842 and causes the resultant operating fluid to flow to the first compressor 51.

According to the configuration described above, the single cooling apparatus 5 can cool the light source 411, which belongs to the first cooling target CT1, and the light modulators 343, which are an example of the second cooling target CT2, which is managed to have the second temperature different from the first temperature, which is the managed temperature of the first cooling target CT1. It is therefore unnecessary to provide a circulation path through which the operating fluid circulates on a cooling target basis, whereby the first circulation path CR1, which cools the light source 411, and the second circulation path CR2, which cools the light modulators 343, can share the first compressor 51, the condenser 52, and the first expander 53. The size of the projector 1 including the cooling apparatus 5 can therefore be reduced.

The second temperature, which is the managed temperature of the second cooling target CT2 including the light modulators 343, is lower than the first temperature, which is the managed temperature of the first cooling target CT1 including the light source 411.

The temperature of the liquid-phase operating fluid flowing to the second evaporator 56 is caused to be lower than the temperature of the liquid-phase operating fluid flowing to the first evaporator 54 because the former liquid-phase operating fluid flows from the condenser 52 to the second evaporator 56 via the first expander 53 and the second expander 55. Therefore, the liquid-phase operating fluid having a temperature appropriate for the cooling of the light source 411 is allowed to flow to the first evaporator 54, and the liquid-phase operating fluid having a temperature appropriate for the cooling of the light modulators 343 is allowed to flow to the second evaporator 56. The cooling of the light source 411, which belongs to the first cooling target CT1, and the cooling of the light modulators 343, which belong to the second cooling target CT2, can therefore be preferably performed.

The pressure of the gas-phase operating fluid compressed by the second compressor 57 is substantially equal to the pressure of the gas-phase operating fluid discharged from the first evaporator 54.

According to the configuration described above, the pressure of the gas-phase operating fluid flowing from the first evaporator 54 to the flow merging tube 5843 via the branch tube 5841 is substantially equal to the pressure of the gas-phase operating fluid flowing from the second compressor 57 to the flow merging tube 5843 via the branch tube 5842. The two gas-phase operating fluids can therefore be readily merged with each other in the flow merging tube 5843. The gas-phase operating fluid discharged from the first evaporator 54 and the gas-phase operating fluid discharged from the second compressor 57 can therefore readily flow to the first compressor 51.

The amount of heat generated by the first cooling target CT1 including the light source 411 is greater than the amount of heat generated by the second cooling target CT2 including the light modulators 343. The flow rate of the liquid-phase operating fluid supplied to the first evaporator 54 via the branch tube 5832 as the first branch tube is greater than the flow rate of the liquid-phase operating fluid supplied to the second evaporator 56 via the branch tube 5833 as the second branch tube.

According to the configuration described above, a larger amount of liquid-phase operating fluid is allowed to flow to the first evaporator 54, which cools the first cooling target CT1, which generates a larger amount of heat than the amount of heat generated by the second cooling target CT2 cooled by the second evaporator 56. The operating fluid, the flow rate of which is appropriate for the cooling of the first cooling target CT1, is therefore allowed to flow to the first evaporator 54, whereby the temperature of the first cooling target CT1 can be readily maintained at the first temperature.

The projector 1 includes the light modulators 343, which modulate the light outputted from the light source 411. The first cooling target CT1 includes the light source 411, and the second cooling target CT2 includes the light modulators 343.

According to the configuration described above, the single cooling apparatus 5 can cool the light source 411 and the light modulators 343, the managed temperatures thereof differ from each other, as described above. Further, the liquid-phase operating fluid having a temperature appropriate for the cooling of the light source 411 is allowed to flow to the first evaporator 54, which consumes the heat transferred from the light source 411 to cool the light source 411, and the liquid-phase operating fluid having a temperature appropriate for the cooling of the light modulators 343 is allowed to flow to the second evaporator 56, which consumes the heat transferred from the light modulators 343 to cool the light modulators 343. The light source 411 and the light modulators 343 can therefore be effectively cooled.

The projector 1 includes the sealed casing SC, which serves as a casing in which the second cooling target CT2, which includes the light modulators 343, and the second evaporator 56 are disposed, and the circulation fan CF, which circulates the cooling gas in the sealed casing SC in the sealed casing SC. The second evaporator 56 changes the liquid-phase operating fluid to the gas-phase operating fluid by using the heat transferred from the second cooling target CT2 and carried by the cooling gas.

According to the configuration described above, the light modulators 343 are disposed in the sealed casing SC, whereby a situation in which dust adheres to the light modulators 343 can be suppressed. Further, the image formation apparatus 34 including the light modulators 343 is cooled by the cooling gas in the sealed casing SC, and the second evaporator 56 cools the cooling gas by using the heat transferred from the image formation apparatus 34 to the cooling gas to evaporate the liquid-phase operating fluid. The configuration of the cooling apparatus 5 can therefore be simplified as compared with a configuration in which the light modulators 343 are each provided with the second evaporator 56, the liquid-phase operating fluid flowing from the second expander 55 is caused to flow to the second evaporators 56, and the gas-phase operating fluid evaporated by the heat of the light modulators 343 is caused to flow to the second compressor 57.

Second Embodiment

A second embodiment of the present disclosure will next be described.

A projector according to the present embodiment has the same configuration as that of the projector 1 according to the first embodiment but differs from the projector 1 in terms of the cooling target cooled by the cooling apparatus 5. In the following description, the same or substantially the same portions as those having been already described have the same reference characters and will not be described.

Figure 5:
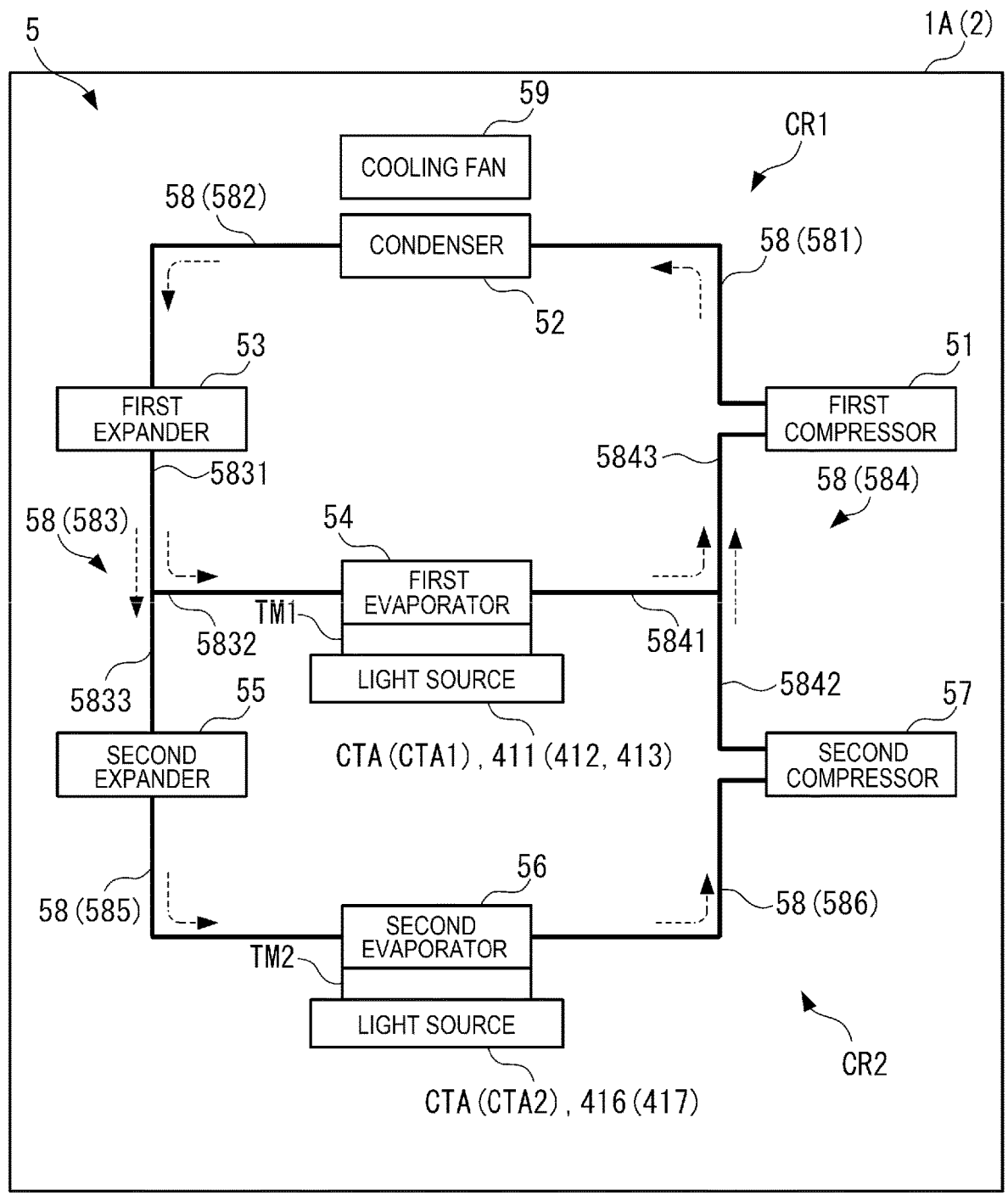
FIG. 5 is a diagrammatic view showing the configuration of a projector in a second embodiment.

FIG. 5 is a diagrammatic view showing the configuration of a projector 1A according to the present embodiment. In FIG. 5, the direction in which the operating fluid flows is indicated by the dotted-line arrows, as in FIG. 4.

In the projector 1A according to the present embodiment, the light source apparatus 4 further includes a light source 416, and the cooling apparatus 5 has the same configuration as that of the cooling apparatus 5 of the projector 1 except that the cooling apparatus 5 cools the light sources 411 and 416 as a cooling target CTA, as shown in FIG. 5.

The light source 411 as a first light source is a first solid-state light source that includes the plurality of first semiconductor lasers 412 and the plurality of second semiconductor lasers 413, which each output the blue light, and outputs light that belongs to a first wavelength band. That is, in the present embodiment, the light that belongs to the first wavelength band is the blue light.

The light source 416 as a second light source is a second solid-state light source including a plurality of third semiconductor lasers 417, which each output red light to be combined with the fluorescence YL outputted from the wavelength conversion element 46 and the blue light L2s outputted from the diffusive reflector 49, and outputs light that belongs to a second wavelength band different from the first wavelength band. That is, the light that belongs to the second wavelength band is the red light in the present embodiment.

In the projector 1A, the cooling apparatus 5 cools a first cooling target CTA1 including the light source 411 and a second cooling target CTA2 including the light source 416.

The first temperature that is the managed temperature of the first cooling target CTA1 including the light source 411 is higher than the second temperature that is the managed temperature of the second cooling target CTA2 including the light source 416. In other words, the second temperature is lower than the first temperature. That is, the temperature of the second cooling target CTA2 needs to be maintained to be lower than the temperature of the first cooling target CTA1.

To this end, the first cooling target CTA1 is coupled to the first evaporator 54 in a heat transferable manner, and the second cooling target CTA2 is coupled to the second evaporator 56 in a heat transferable manner. The cooling apparatus 5 then causes the operating fluid having a temperature lower than the temperature of the operating fluid flowing to the first evaporator 54 to flow to the second evaporator 56. As a result, in the projector 1A, the temperature of the first cooling target CTA1 is maintained at the first temperature, and the temperature of the second cooling target CTA2 is maintained at the second temperature.

Specifically, the first evaporator 54 is coupled to the support member 414 of the light source 411 via the heat transfer member TM1, as in the projector 1 of the first embodiment. The heat generated in the semiconductor lasers 412 and 413 provided in the light source 411 is transferred to the first evaporator 54 via the heat transfer member TM1. The first evaporator 54 evaporates part of the liquid-phase operating fluid flowing from the first expander 53 by using the heat transferred from the semiconductor lasers 412 and 413 to change the part of the liquid-phase operating fluid to the gas-phase operating fluid. The heat of the plurality of first semiconductor lasers 412 and the plurality of second semiconductor lasers 413 as the first solid-state light source is thus consumed, whereby the first cooling target CTA1 including the light source 411 as the first light source is cooled.

The operating fluid flowing path of the gas-phase operating fluid to which the liquid-phase operating fluid has been changed by the first evaporator 54 is the same as the operating fluid flowing path in the cooling apparatus 5 of the projector 1.

The second evaporator 56 is coupled to the light source 416 via a heat transfer member TM2. The heat generated in the plurality of third semiconductor lasers 417 provided in the light source 416 is transferred to the second evaporator 56 via the heat transfer member TM2. The second evaporator 56 evaporates the other part of the liquid-phase operating fluid flowing from the second expander 55 by using the heat transferred from the third semiconductor lasers 417 to change the other part of the liquid-phase operating fluid to the gas-phase operating fluid. The heat of the plurality of third semiconductor lasers 417 as the second solid-state light source is thus consumed, whereby the second cooling target CTA2 including the light source 416 as the second light source is cooled.

In this process, the second expander 55 causes the operating fluid having a temperature further lower than the temperature of the operating fluid flowing from the first expander 53 to flow to the second evaporator 56. The light source 416 having a managed temperature lower than that of the light source 411 can therefore be further effectively cooled.

The operating fluid flowing path of the gas-phase operating fluid to which the liquid-phase operating fluid has been changed by the second evaporator 56 is the same as the operating fluid flowing path in the cooling apparatus 5 of the projector 1.

Effects of Second Embodiment

The projector 1A according to the present embodiment described above can provide the same effects as those provided by the projector 1 according to the first embodiment and further provide the following effects.

The cooling apparatus 5 cools the first cooling target CTA1 and the second cooling target CTA2. The first cooling target CTA1 includes the light source 411 as the first light source that outputs the blue light that is the light that belongs to the first wavelength band. The second cooling target CTA2 includes the light source 416 as the second light source that outputs the red light that is the light that belongs to the second wavelength band different from the first wavelength band.

The configuration described above allows the first cooling target CTA1 including the light source 411 and the second cooling target CTA2 including the light source 416, which has the same configuration as that of the light source 411 but differs from the light source 411 in terms of the managed temperature, to be maintained at the respective managed temperatures.

It is noted that the managed temperature of the plurality of first semiconductor lasers 412 and the plurality of second semiconductor lasers 413 as the first solid-state light source may be lower than or equal to the managed temperature of the third semiconductor lasers as the second solid-state light source.

The first cooling target CTA1 cooled by the first evaporator 54 is not necessarily formed only of the semiconductor lasers that each output the light that belongs to the first wavelength band. For example, the first cooling target CTA1 may include a plurality of semiconductor lasers that each output light that belongs to the second wavelength band in addition to the plurality of semiconductor lasers 412 and 413, which each output the light that belongs to the first wavelength band. Similarly, the second cooling target CTA2 cooled by the second evaporator 56 is not necessarily formed only of the semiconductor lasers that each output the light that belongs to the second wavelength band. For example, the second cooling target CTA2 may include a plurality of semiconductor lasers that each output light that belongs to the first wavelength band in addition to the plurality of semiconductor lasers 417, which each output the light that belongs to the second wavelength band.

The first solid-state light source may instead be formed of semiconductor lasers of one type depending on the configuration of the light source apparatus 4, and the number of semiconductor lasers as the first solid-state light source and the number of semiconductor lasers as the second solid-state light source can each be changed as appropriate.

In addition to the above, the flow dividing tube 5831 may adjust the flow rate of the operating fluid in such a way that one of the flow rate of the operating fluid flowing to the first evaporator 54 and the flow rate of the operating fluid flowing to the second evaporator 56 is greater than the other or the flow rates are equal to each other.

Third Embodiment

A third embodiment of the present disclosure will next be described.

A projector according to the present embodiment has the same configuration as that of the projector 1 according to the first embodiment but differs from the projector 1 in terms of the configurations of the light source apparatus and the cooling apparatus. In the following description, the same or substantially the same portions as those having been already described have the same reference characters and will not be described.

Figure 6:
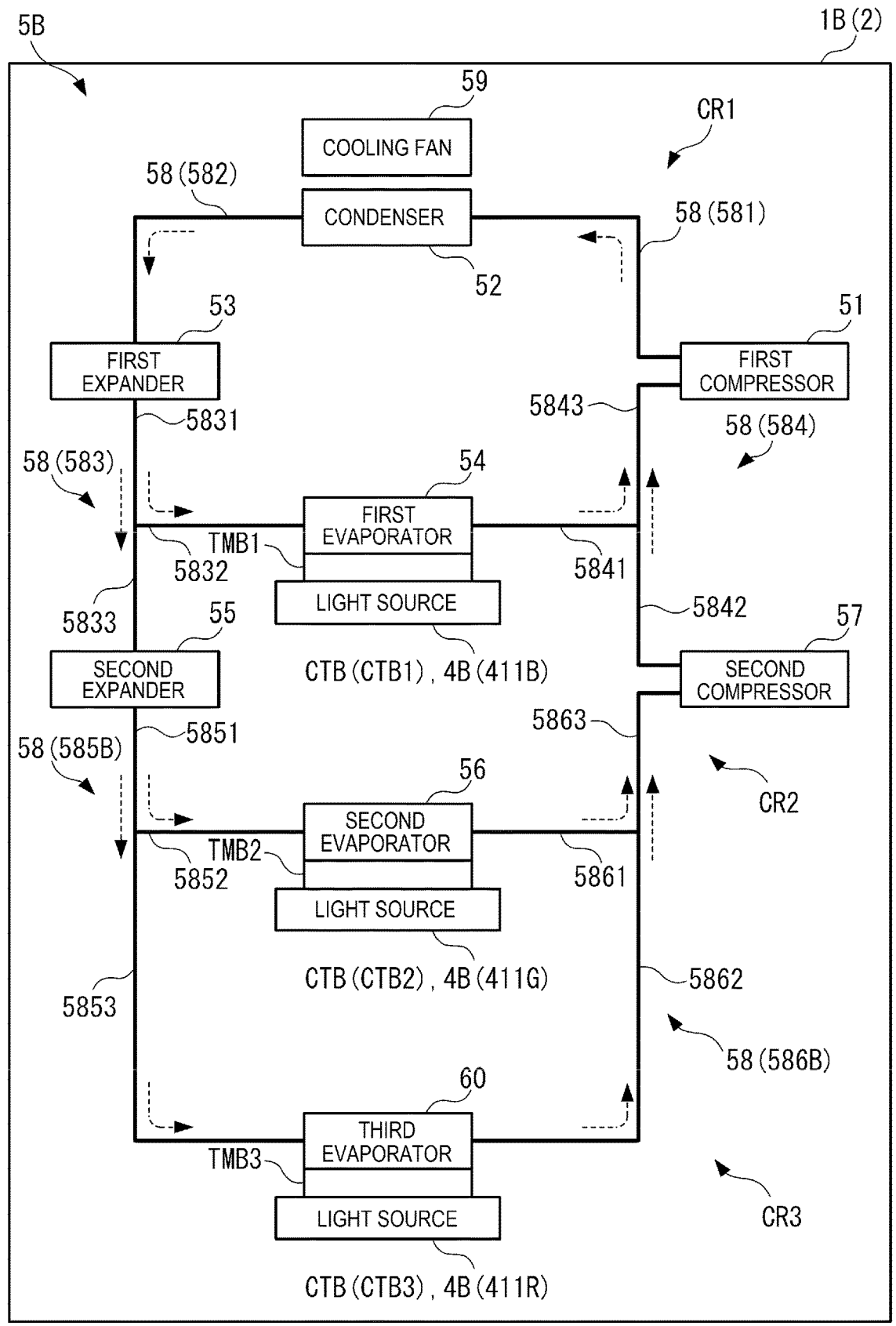
FIG. 6 is a diagrammatic view showing the configuration of a projector in a third embodiment.

FIG. 6 is a diagrammatic view showing a cooling apparatus 5B provided in a projector 1B according to the present embodiment. In FIG. 6, the direction in which the operating fluid flows is indicated by the dotted-line arrows, as in FIG. 4.

The projector 1B according to the present embodiment has the same configuration and function as those of the projector 1 except that the light source apparatus 4 and the cooling apparatus 5 are replaced with a light source apparatus 4B and the cooling apparatus 5B, as shown in FIG. 6.

The light source apparatus 4B includes light sources 411B, 411G, and 411R and further includes, although not shown, optical elements, such as a light combining element that combines color light fluxes outputted from the light sources 411B, 411G, and 411R with one another, a light collection element that collects the color light fluxes having exited out of the light combining element, a diffusing element that diffuses the color light fluxes incident from the light collection element, and a parallelizing element that parallelizes the color light fluxes having exited out of the diffusing element.

The light source 411B as the first light source includes a semiconductor laser that outputs the blue light as the light that belongs to the first wavelength band. The semiconductor laser that outputs the light that belongs to the first wavelength band is the first solid-state light source.

The light source 411G as the second light source includes a semiconductor laser that outputs the green light as the light that belongs to the second wavelength band different from the first wavelength band. The semiconductor laser that outputs the light that belongs to the second wavelength band is the second solid-state light source.

The light source 411R as a third light source includes a semiconductor laser that outputs the red light as the light that belongs to a third wavelength band different from the first and second wavelength bands. The semiconductor laser that outputs the light that belongs to the third wavelength band is a third solid-state light source.

The color light fluxes outputted from the light sources 411B, 411G, and 411R enter the homogenizing apparatus 31 via the optical elements presented as described above by way of example.

The light sources 411B, 411G, and 411R may each include a light emitting diode (LED) or any other solid-state light sources in place of the semiconductor laser.

The cooling apparatus 5B has the same configuration and function as those of the cooling apparatus 5 except that the fifth tube 585 and the sixth tube 586 are replaced with a fifth tube 585B and a sixth tube 586B and a third evaporator 60 is further provided. That is, the cooling apparatus 5B includes the first compressor 51, the condenser 52, the first expander 53, the first evaporator 54, the second expander 55, the second evaporator 56, the second compressor 57, the first tube 581, the second tube 582, the third tube 583, the fourth tube 584, the fifth tube 585B, the sixth tube 586B, the cooling fan 59, and the third evaporator 60, and the cooling apparatus 5B further cools a cooling target CTB.

In the cooling apparatus 5B, the first evaporator 54 is coupled to a first cooling target CTB1 including the light source 411 via a heat transfer member TMB1. The second evaporator 56 is coupled to a second cooling target CTB2 including the light source 411G via a heat transfer member TMB2. The third evaporator 60 is coupled to a third cooling target CTB3 including the light source 411R via a heat transfer member TMB3. At least one of the heat transfer members TMB1 to TMB3 may, however, be omitted.

The fifth tube 585B includes a flow dividing tube 5851, a branch tube 5852, and a branch tube 5853, as does the third tube 583.

The flow dividing tube 5851 couples the second expander 55 to the branch tubes 5852 and 5853. The flow dividing tube 5851, through which the operating fluid flowing from the second expander 55 flows, divides the operating fluid toward the second evaporator 56 and the third evaporator 60.

The branch tube 5852 couples the flow dividing tube 5851 to the second evaporator 56. The branch tube 5852 causes part of the operating fluid divided from the operating fluid flowing through the flow dividing tube 5851 to flow to the second evaporator 56.

The branch tube 5853 couples the flow dividing tube 5851 to the third evaporator 60. The branch tube 5853 causes the other part of the operating fluid divided from the operating fluid flowing through the flow dividing tube 5851 to flow to the third evaporator 60.

The sixth tube 586B includes branch tubes 5861 and 5862 and a flow merging tube 5863, as does the fourth tube 584.

The branch tube 5861 couples the second evaporator 56 to the flow merging tube 5863. The branch tube 5861 causes the operating fluid flowing from the second evaporator 56 to flow to the flow merging tube 5863.

The branch tube 5862 couples the third evaporator 60 to the flow merging tube 5863. The branch tube 5862 causes the operating fluid flowing from the third evaporator 60 to flow to the flow merging tube 5863.

The flow merging tube 5863 couples the branch tubes 5861 and 5862 to the second compressor 57. The flow merging tube 5863 merges the operating fluid flowing from the second evaporator 56 via the branch tube 5861 with the operating fluid flowing from the third compressor 60 via the branch tube 5862 and causes the merged flow to flow to the second compressor 57.

The third evaporator 60 is coupled to the second evaporator 55 via the flow dividing tube 5851 and the branch tube 5853. The operating fluid decompressed by the second evaporator 55 flows to the third evaporator 60 via the flow dividing tube 5851 and the branch tube 5853.

The third evaporator 60 evaporates the liquid-phase operating fluid flowing from the second expander 55 by using the heat transferred from the third cooling target CTB3 via the heat transfer member TMB3 to change the liquid-phase operating fluid to the gas-phase operating fluid, as do the first evaporator 54 and the second evaporator 56. The heat of the third cooling target CTB3 is thus consumed, whereby the third cooling target CTB3 is cooled. The gas-phase operating fluid to which the liquid-phase operating fluid has been changed by the third evaporator 60 is discharged into the branch tube 5862 and merged in the flow merging tube 5863 with the gas-phase operating fluid flowing from the second evaporator 56 via the branch tube 5861, and the merged operating fluid flows to the second compressor 57.

As described above, the cooling apparatus 5B includes the first circulation path CR1, through which the operation fluid that cools the first cooling target CTB1 in the first evaporator 54 circulates, the second circulation path CR2, through which the operation fluid that cools the second cooling target CTB2 in the second evaporator 56 circulates, and the third circulation path CR3, through which the operation fluid that cools the third cooling target CTB3 in the third evaporator 60 circulates.

That is, the first circulation path CR1 is an operating fluid circulation path that causes the operating fluid to sequentially flow through the first compressor 51, the first tube 581, the condenser 52, the second tube 582, the first expander 53, the third tube 583, the first evaporator 54, and the fourth tube 584 and then flow into the first compressor 51 again. The second circulation path CR2 is an operating fluid circulation path that causes the operating fluid to sequentially flow through the first compressor 51, the first tube 581, the condenser 52, the second tube 582, the first expander 53, the third tube 583, the second expander 55, the fifth tube 585, the second evaporator 56, the sixth tube 586, the second compressor 57, and the fourth tube 584 and then flow into the first compressor 51 again. The third circulation path CR3 is an operating fluid circulation path that causes the operating fluid to sequentially flow through the first compressor 51, the first tube 581, the condenser 52, the second tube 582, the first expander 53, the third tube 583, the second expander 55, the fifth tube 585, the third evaporator 60, the sixth tube 586B, the second compressor 57, and the fourth tube 584 and then flow into the first compressor 51 again.

The first compressor 51, the first tube 581, the condenser 52, the second tube 582, the first expander 53, the third tube 583, and the fourth tube 584 are shared by the circulation paths CR1, CR2, and CR3.

The first temperature that is the managed temperature of the first cooling target CTB1 including the light source 411B is higher than the second temperature that is the managed temperature of the second cooling target CTB2 including the light source 411G and the third temperature that is the managed temperature of the third cooling target CTB3 including the light source 411R.

The operating fluids having temperatures appropriate for the cooling of the light sources 411B, 411G, and 411R are therefore allowed to flow to the first evaporator 54, the second evaporator 56, and the third evaporator 60, respectively. The cooling targets CTB1, CTB2, and CTB3 can therefore be maintained at the respective managed temperatures.

Depending on the managed temperatures of the light sources 411B, 411G, and 411R, the flow dividing tube 5831 may adjust the flow rate of the operation fluid flowing to the first evaporator 54 via the branch tune 5832 and the flow rate of the operation fluid flowing to the second expander 55 via the branch tune 5833, and the flow dividing tube 5851 may adjust the flow rate of the operation fluid flowing to the second evaporator 56 via the branch tune 5852 and the flow rate of the operation fluid flowing to the third evaporator 60 via the branch tune 5853.

The projector 1B according to the present embodiment described above can provide the same effects as those provided by the projector 1 shown in the first embodiment.

Variations of Embodiments

The present disclosure is not limited to the embodiments described above, and variations, improvements, and other modifications to the extent that the advantage of the present disclosure is achieved fall within the scope of the present disclosure.

In the first and second embodiments described above, the cooling apparatus 5 has the second circulation path CR2, which cools the second cooling targets CT2 and CTA2, in addition to the first circulation path CR1, which cools the first cooling targets CT1 and CTA1. In the third embodiment described above, the cooling apparatus 5B includes the second circulation path CR2, which cools the second cooling target CT2 and the third circulation path CR3, which cools the third cooling target CTB3, in addition to the first circulation path CR1, which cools the first cooling target CT1, but not necessarily. The second circulation path CR2, which cools the second cooling targets CT2, CTA2, or CTB2, and the third circulation path CR3, which cools the third cooling target CTB3, may not necessarily be provided in the cooling apparatus 5 or 5B. That is, the cooling apparatus 5 may not include the second expander 55, the second evaporator 56, the second compressor 57, the fifth tube 585, or the sixth tube 586, and the cooling apparatus 5B may not include the second expander 55, the second evaporator 56, the second compressor 57, the third evaporator 60, the fifth tube 585B, or the sixth tube 586B. In this case, the third tube 583 only needs to couple the first expander 53 to the first evaporator 54 in such a way that the operation fluid can flow from the first expander 53 to the first evaporator 54, and the fourth tube 584 only needs to couple the first evaporator 54 to the first compressor 51 in such a way that the operation fluid can flow from the first evaporator 54 to the first compressor 51.

The cooling apparatuses 5 and 5B may not include at least one of the second expander 55 and the second compressor 57.

When the cooling apparatus 5 does not include the second expander 55, the branch tube 5833 may be coupled to the second evaporator 56 to cause the liquid-phase operation fluid to flow from the first expander 53 to the first evaporator 54 and the second evaporator 56 via the third tube 583. When the cooling apparatus 5B does not include the second expander 55, the branch tube 5833 may be coupled to the flow dividing tube 5851 of the fifth tube 585B to cause the liquid-phase operation fluid flowing from the first expander 53 to the flow dividing tube 5831 to flow to the first evaporator 54, the second evaporator 56, and the third evaporator 60.

When the cooling apparatus 5 does not include the second compressor 57, the branch tube 5842 may be coupled to the second evaporator 56 to cause the gas-phase operation fluid to flow from the first evaporator 54 and the second evaporator 56 to the first compressor 51 via the fourth tube 584. When the cooling apparatus 5B does not include the second compressor 57, the flow merging tube 5863 of the sixth tube 586B may be coupled to the branch tube 5842 to cause the gas-phase operation fluid to flow from the first evaporator 54, the second evaporator 56, and the third evaporator 60 to the first compressor 51.

In addition to the above, the second temperature, which is the managed temperature of the second cooling targets CT2 and CTA2, is lower than the first temperature, which is the managed temperature of the first cooling targets CT1 and CT1A, but not necessarily. The second temperature may be higher than or equal to the first temperature. At least one of the managed temperatures of the first, second, and third cooling targets may be higher than or equal to the other managed temperatures.

In each of the embodiments described above, the pressure of the gas-phase operating fluid compressed by the second compressor 57 is substantially equal to the pressure of the gas-phase operating fluid discharged from the first evaporator 54, but not necessarily. The values of the pressure of the gas-phase operation fluid described above may differ from each other. In other words, the pressure of the gas-phase operating fluid flowing from the first evaporator 54 to the flow merging tube 5843 via the branch tube 5841 may differ from the pressure of the gas-phase operating fluid flowing from the second compressor 57 to the flow merging tube 5843 via the branch tube 5842. That is, one of the pressure of the gas-phase operating fluid flowing to the flow merging tube 5843 via the branch tube 5841 and the pressure of the gas-phase operating fluid flowing to the flow merging tube 5843 via the branch tube 5842 may be higher than the other.

Further, one of the pressure of the gas-phase operation fluid flowing from the second evaporator 56 to the branch tube 5861 and the pressure of the gas-phase operation fluid flowing from the third evaporator 60 to the branch tube 5862 may be higher than or equal to the other.

In the first embodiment described above, the first cooling target CT1 cooled by the first evaporator 54, which forms the first circulation path CR1, includes the light source 411, and the second cooling target CT2 cooled by the second evaporator 56, which forms the second circulation path CR2, includes the light modulators 343. In the second embodiment described above, the first cooling target CTA1 includes the light source 411, and the second cooling target CTA2 includes the light source 416. In the third embodiment described above, the first cooling target CTB1 includes the light source 411B, the second cooling target CTB2 includes the light source 411G, and the third cooling target CTB3 includes the light source 411R. The first to third embodiments are not necessarily configured as described above, and the cooling targets may be configured differently. For example, the cooling target cooled by the cooling apparatus 5 may be the polarization conversion element 313, the polarization separation element 44, the wavelength converter 461 of the wavelength conversion element 46, the reflection plate of the diffusive reflector 49, or any other optical part, or circuit devices provided in the control apparatus and the power supply apparatus.

Further, for example, the first cooling target CT1 may include only the light source 411 or may include other components in addition to the light source 411. The second cooling target CT2 may include only the light modulators 343 or may include other components in addition to the light modulators 343, as described above. The same holds true for the first cooling targets CTA1 and CTB1, the second cooling targets CTA2 and CTB2, and the third cooling target CTB3.

In the case where projectors are of the same type but include a plurality of cooling targets that have different managed temperatures, generate different amounts of heat, or have different cooling difficulties, such as the projector 1A shown in the second embodiment and the projector 1B shown in the third embodiment described above, at least one of the cooling targets can be the first cooling target, and the other cooling targets can be the second cooling target.

For example, when the three light modulators 343 (343B, 343G, and 343R) described above include a first light modulator having a low managed temperature and a second light modulator having a high managed temperature, one of the first and second light modulators can be the first cooling target, and the other light modulator can be the second cooling target.

In the first embodiment described above, the second evaporator 56 is provided along with the second cooling target CT2 including the light modulators 343 in the sealed casing SC and changes the liquid-phase operating fluid to the gas-phase operating fluid by using the heat of the cooling gas that is a gas in the sealed casing SC and flows to the second cooling target CT2 to cool the second cooling target CT2. That is, the second evaporator 56 consumes the heat transferred from the second cooling target CT2 and carried by the cooling gas to cool the cooling gas, which flows to and cools the second cooling target CT2, but not necessarily. The second evaporator 56 may not be provided in the sealed casing SC. That is, the second evaporator 56 that is not be disposed in the sealed casing SC may cool the cooling gas flowing to the second cooling target CT2. Still instead, the second evaporator 56 may be thermally coupled to the second cooling target CT2 and may evaporate the liquid-phase operating fluid flowing to the second evaporator 56 by using the heat transferred from the second cooling target CT2 to cool the second cooling target CT2. Further, the casing in which the second evaporator 56 is provided may not be a sealed casing that a gas is unlikely to enter from the exterior thereof.

Further, the circulation fan CF is not necessarily provided as long as the cooling gas in the sealed casing SC can cool the second cooling target CT2, and a fan that causes the cooling gas cooled by the second evaporator 56 to flow to the second cooling target CT2 may be provided in place of the circulation fan CF.

In addition, the first evaporator 54 and the first cooling target CT1 may be provided in another casing disposed in the exterior housing 2, and the first evaporator 54 may cool the cooling gas flowing to the first cooling target CT1 in the another casing.

In the embodiments described above, the cooling apparatuses 5 and 5B each include the cooling fan 50, which causes the cooling gas to flow to the condenser 52, but not necessarily, and the cooling apparatuses 5 or 5B may not necessarily include the cooling fan 59.

In the first embodiment described above, the projector 1 includes the image projection apparatus 3 shown in FIG. 2, and the image projection apparatus 3 includes the light source apparatus 4 shown in FIG. 3, but not necessarily. The configurations and layout of the optical parts provided in the image projection apparatus 3 can be changed as appropriate, and the configurations and layout of the optical parts provided in the light source apparatus 4 can be changed as appropriate. For example, the wavelength conversion element 46 provided in the light source apparatus 4 is a reflective wavelength conversion element that outputs the fluorescence YL generated in the wavelength converter 461 toward the light incident side on which the blue light L1s is incident, and the light source apparatus may instead employ a transmissive wavelength conversion element that outputs the fluorescence along the direction in which the blue light L1s is incident.

Similarly, the configuration of the light source apparatus 4B shown in the third embodiment described above is not limited to the configuration described above and can be changed as appropriate.

In the first embodiment described above, the light source 411 of the light source apparatus 4 includes the semiconductor lasers 412 and 413. In the second embodiment described above, the light source apparatus 4 includes the light source 416 including the semiconductor lasers 417 in addition to the light source 411. In the third embodiment described above, the light source apparatus 4B includes the light sources 411B, 411G, and 411R each including a semiconductor laser. However, the light source apparatuses 4 and 4B are not necessarily configured as described above and may each include as the light source a light source lamp, such as an ultrahigh-pressure mercury lamp, or another solid-state light source, such as and an LED. Still instead, the light source apparatuses 4 and 4B may each include as the light source LDs, LEDs, or any other solid-state light sources or light source lamps that output the red light, the green light, and the blue light. In this case, the cooling targets cooled by the cooling apparatuses 5 and 5B may be the other solid-state light sources or light source lamps.

In the embodiments described above, the projector 1 includes the three light modulators 343 (343B, 343G, and 343R), but not necessarily. The present disclosure is also applicable to a projector including two or fewer light modulators or four or more light modulators.

In the embodiments described above, the light modulators 343 are each a transmissive liquid crystal panel having a light incident surface and a light exiting surface different from each other, but not necessarily. The light modulators may each be a reflective liquid crystal panel having a light incident surface and a light exiting surface formed of a single surface. Further, a light modulator using any component other than a liquid-crystal-based component and capable of modulating an incident light flux to form an image according to image information, such as a device using micromirrors, for example, a digital micromirror device (DMD), may be employed.

What is claimed is:

1. A projector that modulates light emitted from a light source and projects the modulated light, the projector comprising:
    an exterior housing forming an exterior of the projector;
    a first cooling target; and
    a cooling apparatus provided in the exterior housing and configured to cool the first cooling target,
    wherein the cooling apparatus includes
    a first tube, a second tube, a third tube, and a fourth tube,
    a first compressor configured to compress an operating fluid in a gas phase,
    a condenser coupled to the first compressor via the first tube and configured to condense the gas-phase operating fluid compressed by the first compressor into the operating fluid in a liquid phase,
    a first expander coupled to the condenser via the second tube and configured to decompress the liquid-phase operating fluid condensed by the condenser to change to the operating fluid in which the liquid phase and the gas phase are mixed with each other, and
    a first evaporator coupled to the first expander via the third tube, configured to change a portion of the liquid-phase operating fluid supplied from the first expander to the gas-phase operating fluid by using heat transferred from the first cooling target, and configured to discharge the gas-phase operating fluid to the first compressor coupled via the fourth tube.

2. The projector according to claim 1, further comprising a second cooling target managed to have a second temperature different from a first temperature that is a managed temperature of the first cooling target,
    wherein the cooling apparatus further includes
    a fifth tube and a sixth tube,
    a second expander configured to decompress another portion of the liquid-phase operating fluid supplied from the first expander via the third tube,
    a second evaporator coupled to the second expander via the fifth tube and configured to change the liquid-phase operating fluid supplied from the second expander to the gas-phase operating fluid by using heat transferred from the second cooling target, and
    a second compressor coupled to the first compressor via the fourth tube, coupled to the second evaporator via the sixth tube, and configured to compress the gas-phase operating fluid supplied from the second evaporator,
    the third tube includes
    a flow dividing tube configured to divide the operating fluid supplied from the first expander,
    a first branch tube configured to conduct, to the first evaporator, a portion of the operating fluid divided from the operating fluid flowing through the flow dividing tube, and
    a second branch tube configured to conduct, to the second evaporator, another portion of the operating fluid divided from the operating fluid flowing through the flow dividing tube via the second expander and the fifth tube, and
    the fourth tube includes
    a third branch tube coupled to the first evaporator,
    a fourth branch tube coupled to the second compressor, and
    a flow merging tube configured to merge the operating fluid supplied from the first evaporator via the third branch tube with the operating fluid supplied from the second compressor via the fourth branch tube and configured to conduct the merged operating fluid to the first compressor.

3. The projector according to claim 2, wherein the second temperature is lower than the first temperature.

4. The projector according to claim 2, wherein a pressure of the gas-phase operating fluid compressed by the second compressor is substantially equal to a pressure of the gas-phase operating fluid to be discharged from the first evaporator.

5. The projector according to claim 2,
    wherein an amount of heat generated by the first cooling target is greater than an amount of heat generated by the second cooling target, and
    a flow rate of the liquid-phase operating fluid supplied to the first evaporator is greater than a flow rate of the liquid-phase operating fluid supplied to the second evaporator.

6. The projector according to claim 2, further comprising a light modulator configured to modulate the light emitted from the light source,
    wherein the first cooling target includes the light source, and
    the second cooling target includes the light modulator.

7. The projector according to claim 2, further comprising:
    a casing in which the second cooling target and the second evaporator are disposed, and
    a circulation fan that circulates a cooling gas in the casing,
    wherein the second evaporator changes the liquid-phase operating fluid to the gas-phase operating fluid by using heat transferred from the second cooling target and carried by the cooling gas.

8. The projector according to claim 2,
    wherein the first cooling target includes a first light source configured to emit light which belongs to a first wavelength band, and
    the second cooling target includes a second light source configured to emit light which belongs to a second wavelength band different from the first wavelength band.

* * * * *